US012066853B2

(12) United States Patent  (10) Patent No.: US 12,066,853 B2
Srinivasan et al.  (45) Date of Patent: Aug. 20, 2024

(54) CONFIGURATION OF BASE CLOCK FREQUENCY OF PROCESSOR BASED ON USAGE PARAMETERS

(71) Applicant: Intel Corporation, Santa Clara, CA (US)

(72) Inventors: Vasudevan Srinivasan, Portland, OR (US); Krishnakanth V. Sistla, Portland, OR (US); Corey D. Gough, Hillsboro, OR (US); Ian M. Steiner, Portland, OR (US); Nikhil Gupta, Portland, OR (US); Vivek Garg, Folsom, CA (US); Ankush Varma, Portland, OR (US); Sujal A. Vora, San Jose, CA (US); David P. Lerner, Santa Clara, CA (US); Joseph M. Sullivan, Santa Clara, CA (US); Nagasubramanian Gurumoorthy, Portland, OR (US); William J. Bowhill, Framingham, MA (US); Venkatesh Ramamurthy, Portland, OR (US); Chris MacNamara, Limerick (IE); John J. Browne, Limerick (IE); Ripan Das, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/329,492

(22) Filed: Jun. 5, 2023

(65) Prior Publication Data

US 2023/0315143 A1    Oct. 5, 2023

Related U.S. Application Data

(63) Continuation of application No. 17/520,296, filed on Nov. 5, 2021, now Pat. No. 11,703,906, which is a (Continued)

(51) Int. Cl.
*G06F 1/08* (2006.01)
*G06F 1/3203* (2019.01)
(Continued)

(52) U.S. Cl.
CPC .............. *G06F 1/08* (2013.01); *G06F 1/3203* (2013.01); *G06F 1/324* (2013.01);
(Continued)

(58) Field of Classification Search
CPC .......... G06F 1/08; G06F 1/3203; G06F 1/324; G06F 9/30101; G06F 9/45558; G06F 2009/45591; Y02D 10/00
See application file for complete search history.

(56) References Cited

U.S. PATENT DOCUMENTS 6,754,837 B1  6/2004  Helms
6,886,093 B2  4/2005  Henry et al.
(Continued)

OTHER PUBLICATIONS

International Search Report and Written Opinion dated Nov. 24, 2017, on application No. PCT/US2017/019484.
(Continued)

*Primary Examiner* — Glenn A. Auve
(74) *Attorney, Agent, or Firm* — Nicholson De Vos Webster & Elliott LLP

(57) ABSTRACT

A processing device includes a plurality of processing cores, a control register, associated with a first processing core of the plurality of processing cores, to store a first base clock frequency value at which the first processing core is to run, and a power management circuit to receive a base clock frequency request comprising a second base clock frequency value, store the second base clock frequency value in the control register to cause the first processing core to run at the second base clock frequency value, and expose the second
(Continued)

base clock frequency value on a hardware interface associated with the power management circuit.

30 Claims, 13 Drawing Sheets

Related U.S. Application Data continuation of application No. 16/480,830, filed as application No. PCT/US2017/019484 on Feb. 24, 2017, now Pat. No. 11,169,560.

(51) Int. Cl.
  *G06F 1/324* (2019.01)
  *G06F 9/30* (2018.01)
  *G06F 9/455* (2018.01)

(52) U.S. Cl.
  CPC ...... *G06F 9/30101* (2013.01); *G06F 9/45558* (2013.01); *G06F 2009/45591* (2013.01); *Y02D 10/00* (2018.01)

(56) References Cited

U.S. PATENT DOCUMENTS

| | | |
|---|---|---|
| 8,566,627 B2 | 10/2013 | Halepete et al. |
| 9,052,901 B2 | 6/2015 | Shah et al. |
| 11,169,560 B2 | 11/2021 | Srinivasan et al. |
| 11,703,906 B2* | 7/2023 | Srinivasan .......... G06F 9/30101 713/501 |
| 2007/0150893 A1 | 6/2007 | Grobman |
| 2007/0204186 A1 | 8/2007 | Brown et al. |
| 2009/0055826 A1 | 2/2009 | Bernstein et al. |
| 2010/0011233 A1 | 1/2010 | Halepete et al. |
| 2010/0235678 A1 | 9/2010 | Kompella et al. |
| 2011/0239015 A1 | 9/2011 | Boyd et al. |
| 2012/0110352 A1 | 5/2012 | Branover et al. |
| 2013/0246820 A1 | 9/2013 | Branover et al. |
| 2014/0068290 A1 | 3/2014 | Bhandaru et al. |
| 2015/0134572 A1 | 5/2015 | Forlines et al. |
| 2015/0149800 A1 | 5/2015 | Gendler et al. |
| 2016/0019181 A1 | 1/2016 | Tan et al. |
| 2016/0085293 A1 | 3/2016 | Bhandaru et al. |
| 2016/0091938 A1 | 3/2016 | Edwards et al. |
| 2016/0203012 A1 | 7/2016 | Dong et al. |
| 2016/0259392 A1 | 9/2016 | Weissmann et al. |
| 2017/0075733 A1 | 3/2017 | Kannan |
| 2017/0206118 A1 | 7/2017 | Therien et al. |
| 2017/0249000 A1 | 8/2017 | Ragland et al. |

OTHER PUBLICATIONS

International Preliminary Report on Patentability dated Aug. 27, 2019 for PCT Patent Application No. PCT/US2017/019484.

* cited by examiner

400 receive, by a processing device a specification comprising a target service level associated with a software object, wherein the target service level comprises a first base clock frequency value associated with a plurality of processing cores of the processing device 402

Determine whether the processing device comprises enough processing cores available to support the target service level 404

Responsive to determining that the processing device does not have enough, transmit a request, to a power management circuit of the processing device, to cause the available processing cores to run at a second base clock frequency value that is higher than the first base clock frequency value 406

Figure 4 ated Nov. 5, 2021, entitled
CONFIGURATION OF BASE CLOCK FREQUENCY OF PROCESSOR BASED ON USAGE PARAMETERS

CROSS REFERENCE TO RELATED APPLICATION

The present application is a continuation of U.S. application Ser. No. 17/520,296, filed Nov. 5, 2021, entitled "CONFIGURATION OF BASE CLOCK FREQUENCY OF PROCESSOR BASED ON USAGE PARAMETERS," which is a continuation of U.S. application Ser. No. 16/480,830, filed Jul. 25, 2019, now U.S. Pat. No. 11,169,560, entitled "CONFIGURATION OF BASE CLOCK FREQUENCY OF PROCESSOR BASED ON USAGE PARAMETERS," which is a national phase entry under 35 U.S.C. § 371 of International Application No. PCT/US2017/019484, filed Feb. 24, 2017, entitled "CONFIGURATION OF BASE CLOCK FREQUENCY OF PROCESSOR BASED ON USAGE PARAMETERS." PCT/US2017/019484 designated, among the various States, the United States of America. The Specifications of the PCT/US2017/019484, Ser. Nos. 16/480,830, and 17/520,296 applications are hereby incorporated by reference.

TECHNICAL FIELD

The present disclosure relates to processors and, more specifically, to the configuration of the base frequency of a processor based on usage parameters.

BACKGROUND

A computing device may include one or more processing cores in one or more processors (such as central processing units (CPUs)) for executing instructions. The computing device may also include a memory device (such as random-access memory (RAM)) for storing the instructions and data associated with performing tasks (including user application and system application such as the kernel of an operating system) on the one or more processing cores. A manufacturer may design a processor to operate at a base clock frequency value, where the base clock frequency value is a guaranteed clock speed at which the processor can run at a full workload without violating the thermal design power (TDP) requirement of the processor. The TDP indicates the maximum amount of heat generated by the processor that the cooling system associated with the processor can adequately dissipate. The manufacturer may mark the processor with the base clock frequency value.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 4 is a block diagram of a method to set the base clock frequency value based on a target service level according to an embodiment of the present disclosure.

DETAILED DESCRIPTION

Figure 1:
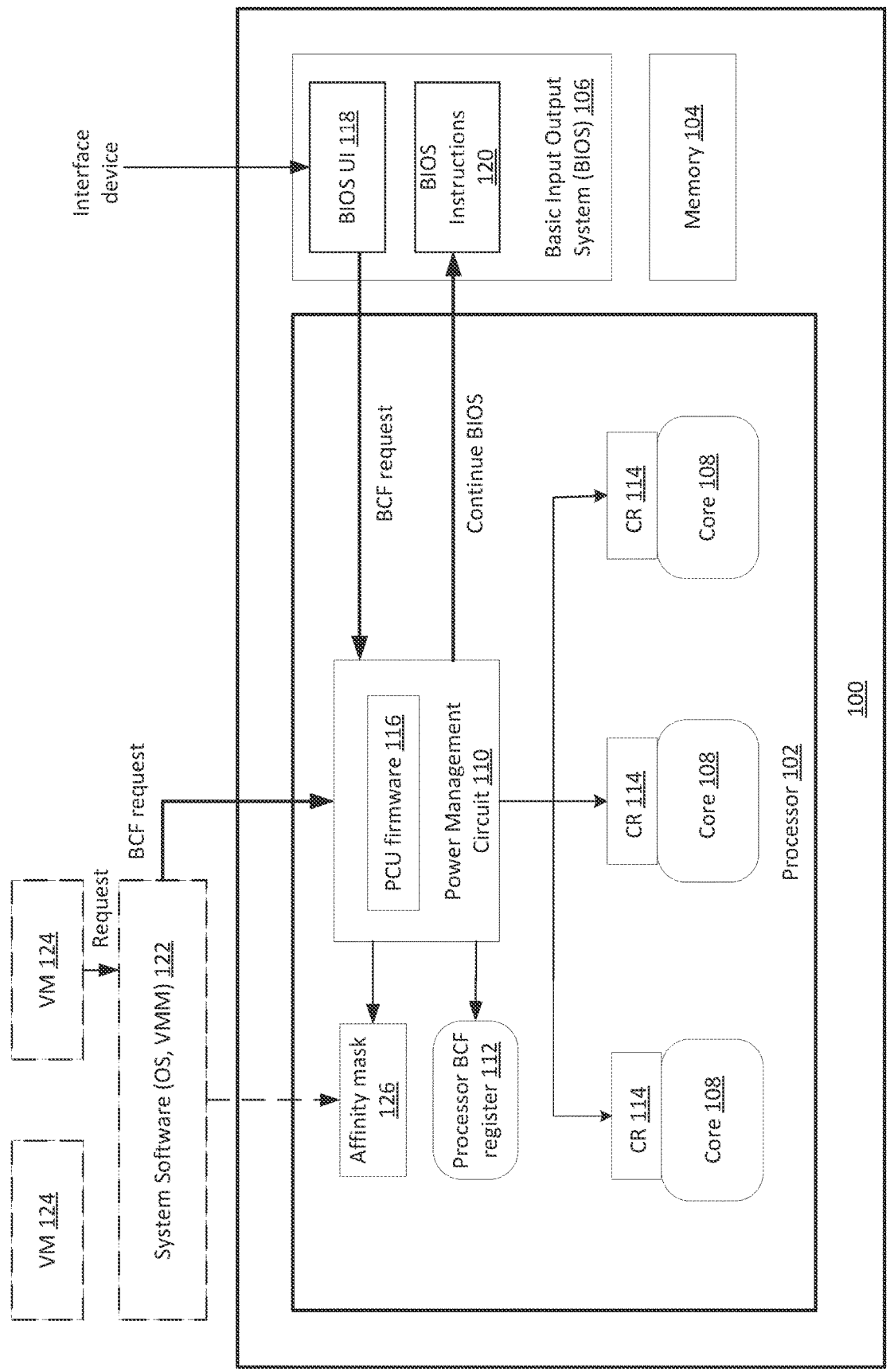
FIG. 1 illustrates a system according to an embodiment of the present disclosure.

The manufacturer determines a base clock frequency value for a processor through design and testing processes, and may label the base clock frequency value on the processor. The base clock frequency value assigned by the manufacturer is typically determined based on a particular usage scenario. An example of the particular usage scenario may be a specific combination of worst case workload, a TDP target, a reliability target etc. The manufacturer commonly does not provide an end user with any mechanism to change the base clock frequency value of the processor (e.g., to a value higher than the assigned base clock frequency value). This prohibition is to prevent violations of the TDP requirement of the processor. Although a processor may include hardware features (e.g., the Turbo Boost Technology) that allow the processor to opportunistically run above the base clock frequency value labeled by the manufacturer, these hardware features do not guarantee the processor to run at a clock speed higher than the base clock frequency value for a determined workload. Because the Turbo Boost Technology does not guarantee a sustained clock speed for the workload, a cloud service provider cannot price the cloud service provided using these opportunistic high clock frequencies when entering a service level agreement (SLA) with a customer.

Embodiments of the present disclosure address the above-noted and other deficiencies by providing, to end users, options to set the base clock frequency of a processor to a value above or below the manufacturer-assigned base clock frequency value for different usage scenarios. A usage scenario may be specified by a set of parameters including, for example, a target number of processing cores in the processor to be used, a target thermal design power (TDP) quantity, a target workload (e.g., as a percentage of the TDP), and a target reliability measurement (e.g., useful life of the processor). Embodiments may include a user interface that may provide a user with the options to choose a target usage scenario from a list of usage scenarios. For example, the user interface may include these options during the booting process. Alternatively, an application running on the processor may provide these options. The processor or a controller circuit associated with the processor may utilize the selected usage scenario to determine a target base clock frequency value for a set of processing cores in the processor. The set of processing cores may be fewer than all of the processing cores in the processor (e.g., 2 out of 6 processing cores). The processor or a controller may also utilize the usage scenarios to determine a set of target base clock frequency values for multiple disjoint sets of processing cores in the processor (e.g. 2 out of 6 processing cores at a first base clock frequency value (X) and remaining 4 out of 6 processing cores at a second base clock frequency value (Y)). Further, the processor may update the base clock frequency value used by a firmware (PCU firmware) running on a power management circuit associated with the processor to the target base clock frequency value. The PCU firmware may calculate power consumptions and heat generation based on the target base clock frequency value for the set of processing cores. Responsive to setting the PCU calculation according to the target base clock frequency value, the processor may configure the set of processing cores to run at the target base clock frequency value and enable the set of processing cores to run at the target base clock frequency value. This way, a cloud service provider may price the enhanced target base clock frequency value with the end user in a service level agreement.

FIG. 1 illustrates a system 100 according to an embodiment of the present disclosure. As shown in FIG. 1, processing system 100 (e.g., a system-on-a-chip (SOC) or a motherboard of a computer system) may include a processor 102 and a memory device 104 communicatively coupled to processor 102. Processor 102 may be a hardware processing device such as, for example, a central processing unit (CPU) or a graphic processing unit (GPU) that includes one or more processing cores 108 to execute software applications. System 100 may also include a Basic Input Output System (BIOS) chipset 106 to store system initiation instructions during system boot (e.g., at power on). BIOS chipset 106 can be a read-only memory (ROM) or a flash memory to store these instructions.

Figure 6:
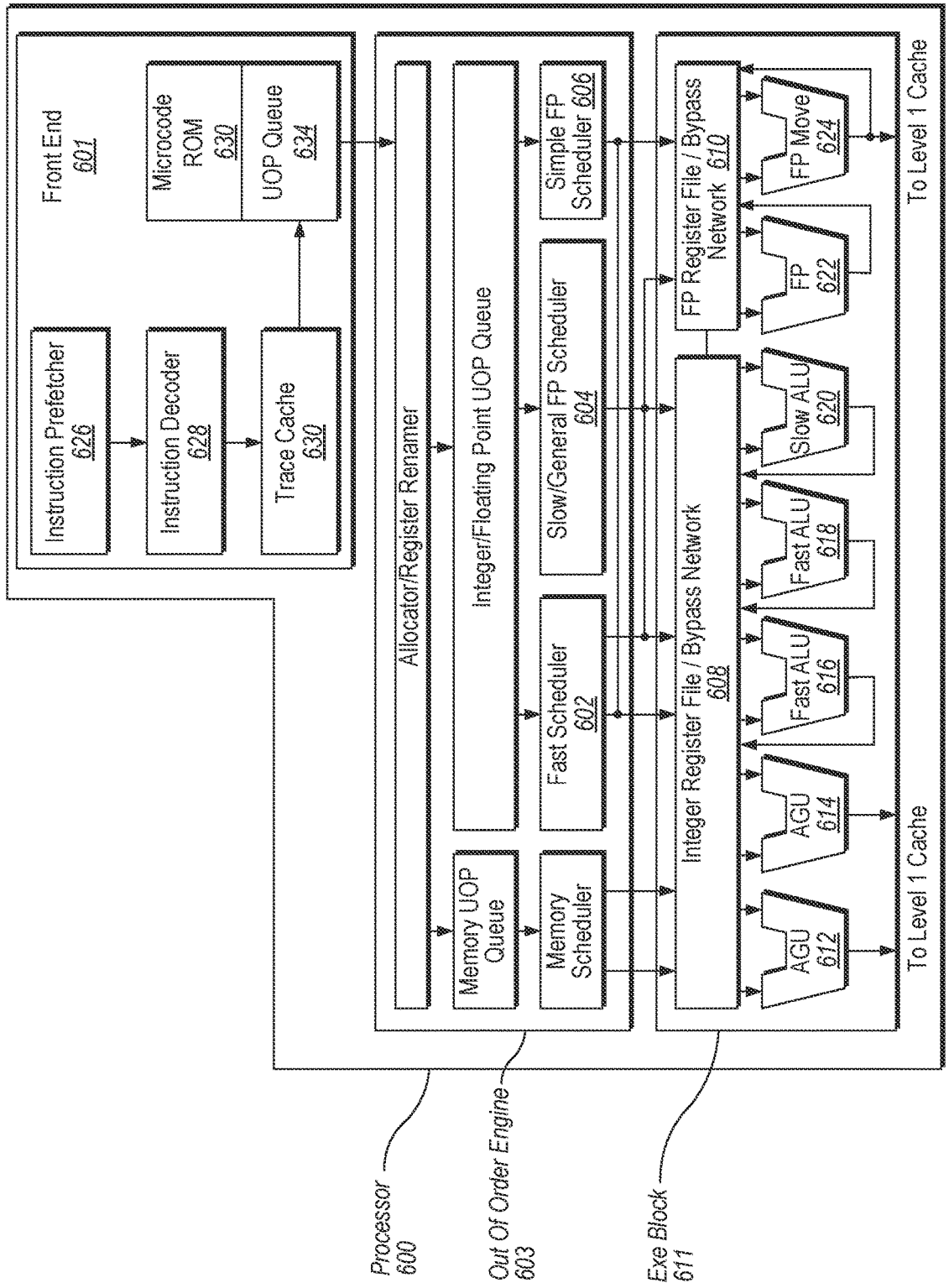
FIG. 6 illustrates a block diagram of the micro-architecture for a processor that includes logic in accordance with one embodiment of the disclosure.
Figure 7:
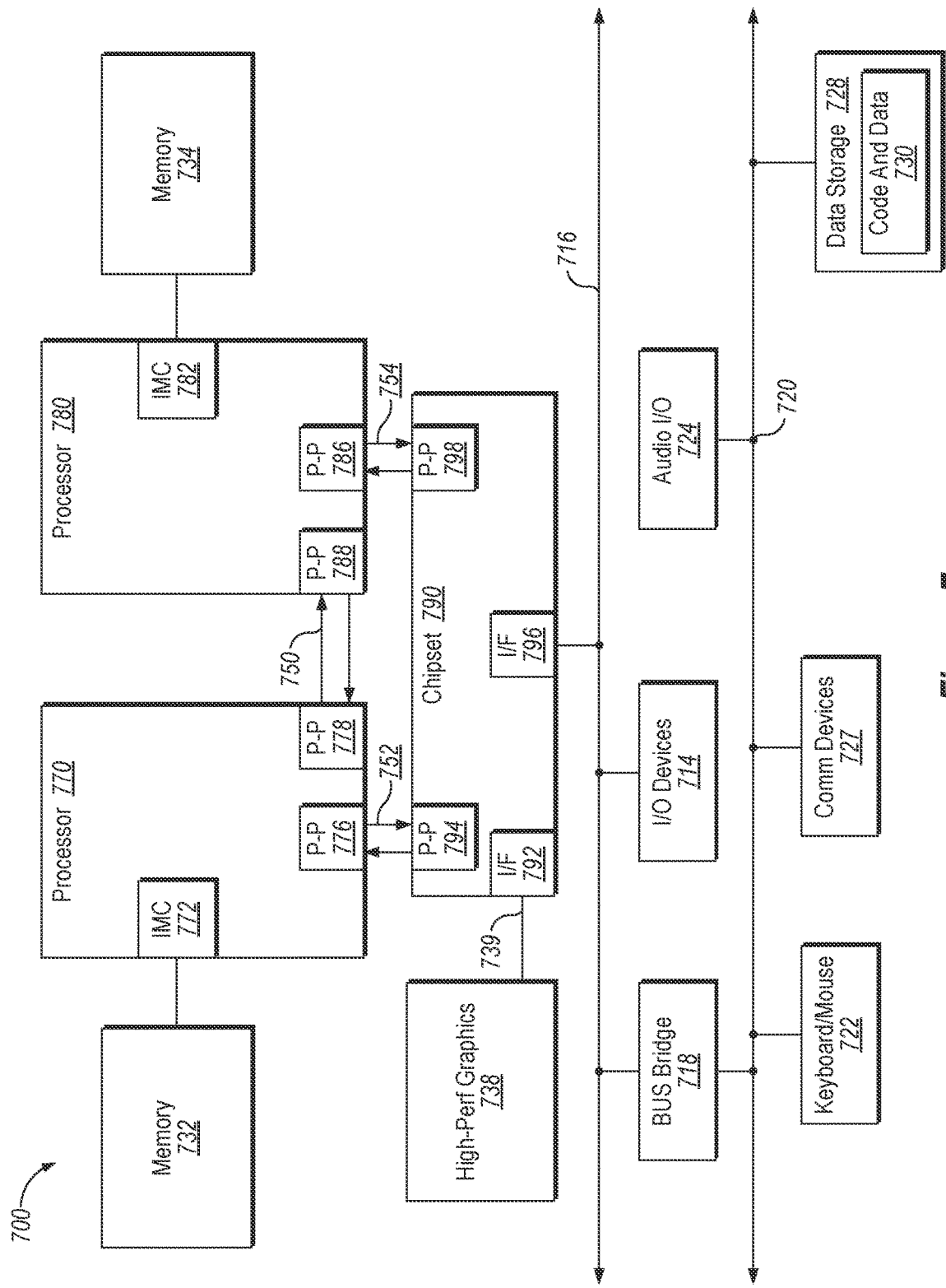
FIG. 7 is a block diagram illustrating a system in which an embodiment of the disclosure may be used.

Processor 102 may further include processing cores 108, a power management circuit 110 (such as, for example, the power control unit (PCU) of x86 processors), and control registers 112, 114, 126. Processing cores 108 in various implementations may be provided by in-order cores or out-or-order cores. In an illustrative example, processing core 108 may have a micro-architecture including processor logic and circuits used to implement an instruction set architecture (ISA). Processors 102 with different micro-architectures can share at least a portion of a common instruction set. For example, the same register architecture of the ISA may be implemented in different ways in different micro-architectures using various techniques, including dedicated physical registers, one or more dynamically allocated physical registers using a register renaming mechanism (e.g., the use of a register alias table (RAT), a reorder buffer (ROB) and a retirement register file), as illustrated by FIGS. 6-7.

As discussed above, the manufacturer, during the fabrication and testing of the processor, may determine a base clock frequency value for processor 102. A base clock frequency value is the highest certified clock speed at which processor 102 can run with a pre-determined workload (e.g., a worst workload). A workload of a task running on processor 102 can be measured in terms of the number of clock cycles used to perform the task. The upper limit of instructions that can be executed per clock cycle is determined based on many factors including the heat generated by the execution of these instructions. In one embodiment, processor 102 may include control register 112 (referred to as processor base clock frequency (BCF) register) to store the base clock frequency value assigned to processor 102. The pre-determined base clock frequency value is the default, initial value stored in control register 112. In one embodiment, each one of processing cores 108 may be associated with a respective control register 114 to store a corresponding base clock frequency value for the corresponding core 108. Each control register 114 obtained from the manufacturer may store the default base clock frequency value assigned to processor 102. Additionally, control register 126 may store an affinity mask to indicate which processing cores 108 are active. In one embodiment, affinity mask 126 is a bit map, where each bit stores an activity status for a corresponding processing core. For example, when a bit is set to an active status (e.g., "1"), the corresponding processing core is to run according the base clock frequency value associated with the processing core. When the bit is set to an inactive status (e.g., "0"), the corresponding processing core is not available to software applications or is idle. In one embodiment, power management circuit 110 may determine which processor cores 108 are active, and to set bits in the affinity mask corresponding to active processing cores to the active status and bits corresponding to inactive processing cores to the inactive status. In another embodiment (as discussed in conjunction with FIG. 3), system software 122 may set the affinity mask.

In another embodiment, processor BCF register 112 may store a data structure including data items, wherein each data item may contain a processing core identifier and a corresponding per-core base clock frequency value as well as the affinity mask bit. In another embodiment, BCF register 112 may store a reference to a data structure stored in a memory, where the data structure includes the data items. Thus, processing cores 108 may operate according to the per-core base clock frequency values stored in the data structure. The per-core base clock frequency values allow each processing core to operate at its own base clock frequency which may be different from another processing core or from the base clock frequency value of the processor 102.

Power management circuit 110 can be a microcontroller programmed with a power control unit (PCU) firmware 116. PCU firmware 116 may include code encoding functionalities associated with managing processor temperature based on the base clock frequency value of processor 102 and/or the per-core base clock frequency values of processing cores 108. In one embodiment, power management circuit 110 executing PCU firmware 116 may, during the boot, read BIOS instructions 120 stored in BIOS chipset 106 to perform the initialization of system 100. PCU firmware 116 may also include code to manage, based on thermal sensor data and workload requests generated by system software 122, base clock frequency values associated processor 102 and/or processing cores 108. For example, PCU firmware 116 may shut down inactive processing cores and divert the spare power to active processing cores. PCU firmware 116 may also calculate, based on a thermal generation model of the processing device, a thermal energy generated by the processing device. The thermal generation model may use the base clock frequency values of active processing cores as input parameters.

The manufacturer may determine the base clock frequency value of processor 102 based on a pre-determined set of usage scenarios for the processor utilizing all of the processing cores 108. In operation, the target usage scenarios may differ from the pre-determined set of usage conditions that had been tested by the manufacturer. In some situations, the target usage scenario may allow processor 102 or some processing cores 108 of processor 102 to run at a target base clock frequency value that is higher than the base clock frequency value assigned by the manufacturer. In one embodiment of the present disclosure, processor 102 may provide firmware (e.g., PCU firmware 116 during BIOS booting up) with a hardware interface to allow changing the base clock frequency value stored in control register 112 of processor 102 and/or values stored in control registers 114 of processing cores 108 (including the affinity mask stored in control register 126). Further, processor 102 may also expose an application programming interface (API) to system software 122 (e.g., the operating system or the virtual machine monitor (VMM)) to allow the system software to identify the usage scenario and send a base clock frequency request, using the API, to power management circuit 110. The request may include the target base clock frequency value determined by system software 122 for a usage scenario. Power management circuit 110 may set the target base clock frequency for one or more processing cores based on the request.

In one embodiment, BIOS chipset 106 may generate the base clock frequency request during the boot process of processing system 100. In another embodiment, system software (e.g., the operating system or VMM) 122 may generate the base clock frequency request in response to a change of usage scenario (e.g., addition/removal of a virtual machine). The base clock frequency request received by power management circuit 110 may include a number of processing cores (a subset of, or all available processing cores) determined based on a usage scenario and the target base frequency value associated with these processing cores. Responsive to receiving the base clock frequency request, PCU firmware 116 running on power management circuit 110 may set the target base frequency value associated with these processing cores and the corresponding bits in the affinity mask. In one embodiment, the PCU firmware 116 may change the base clock frequency value of processor 102 by storing the target base clock frequency value in control register 112, and change the base clock frequency of processing core 108 by storing the target base clock frequency value in a corresponding control register 114.

In one embodiment, processing system 100 may, during the system boot process, display options to an end user to choose a usage scenario in order to generate, based on end user selection, a base clock frequency request to power management circuit 110. As shown in FIG. 1, BIOS chipset 106 may store instructions that, when executed during the boot process, present a BIOS user interface 118 on an input/output device (e.g., display device and a keyboard or a mouse) and further store BIOS instructions 120 for setting up different devices of processing system 100. BIOS user interface 118 may present, on an interface device (e.g., a display device), the status at different stages of the boot process. In one embodiment, BIOS user interface 118 may present a list of usage scenarios to the user. Responsive to receiving a selection of a usage scenario, the boot process may include the execution of instructions (e.g., by power management circuit 116) to generate a base clock frequency request to power management circuit 110. The base clock frequency request may include the target base clock frequency value and optionally the number of processing cores to run at the target base clock frequency value. Power management circuit 110 may then set up processor 102 based on the received base clock frequency request.

Figure 2A:
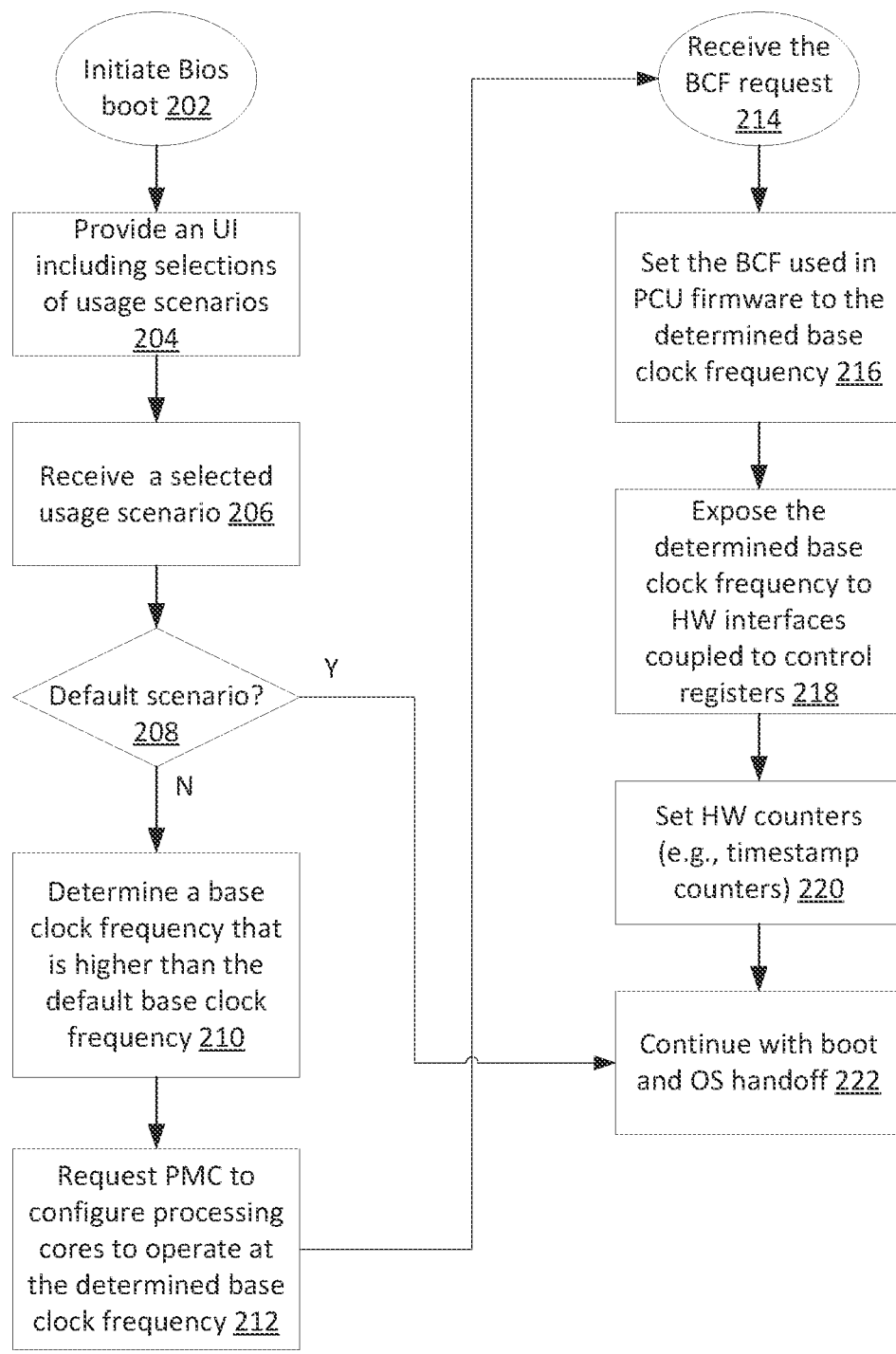
FIG. 2A illustrates a process to set up the base clock frequency during system power-up according to an embodiment of the present disclosure.

FIG. 2A illustrates a process 200 to set up the base clock frequency during system boot process according to an embodiment of the present disclosure. As shown in FIG. 2A, at 202, system 100 may start the boot process. A controller (e.g., power management circuit 110) of processor 102 may read the sequence of instructions stored in the BIOS chipset to set up different devices associated with system 100. The boot process may also present status of the boot process on a display device. Responsive to executing instructions to set up processor 102 of system 100, at 204, the boot process may display, on the display device, a list of usage scenarios for the user to choose. Each usage scenario may specify a set of parameters including, for example, a target number of processing cores in the processor to be used, a target thermal design power (TDP), a target workload (e.g., as a percentage of the TDP), and a target reliability measurement. The user may select, from the list of usage scenarios, a usage scenario that matches his or her need. At 206, the system boot instructions may receive the selection and at 208, further determine whether the selected usage scenario is a default usage scenario, where the default usage scenario is the one of those scenarios tested by the manufacturer and assigned with the base clock frequency value labeled on the processor. Responsive to determining that the selected usage scenario is the default usage scenario, at 222, the boot process may continue with other instructions to set up devices other than processor 102 while processor 102 is to run at the assigned based clock frequency and hand over the system software after the boot process completes.

Responsive to determining that the selected usage scenario is not the default usage scenario, at 210, the boot process may continue with executing instructions to determine a target base clock frequency based on the selected usage scenario. The list of usage scenarios may be constructed during the manufacturing of the processor as additional usage scenarios and corresponding base clock frequency determined. The controller (e.g. power management circuit 110 executing PCU firmware 116) may determine the target base clock frequency value for the selected usage scenario. In one embodiment, this may be implemented as a conversion table including mappings from usages scenarios to target base clock frequency values. For example, the table may contain a list of active core counts and a corresponding base frequency value. Depending on the selected number of active core count, the corresponding base frequency value will be used. The determined target base clock frequency value may be associated with the processor 102 (thus, for all processing cores 108 in processor 102). The determined target base clock frequency value may also be associated with fewer than all of the processing cores 108 in processor 102. At 212, the boot process may continue with executing instructions to transmit a base clock frequency request to power management circuit 110. The base clock frequency request may include the target base clock frequency value and optionally, the number of processing cores associated with the target base clock frequency value.

At 214, power management circuit 110 may receive the base clock frequency request from the execution of instructions stored in BIOS chipset 106. At 216, power management circuit 110 may first update the base clock frequency value (which is the assigned one at the initial) used in various algorithms in PCU firmware 116 to the target base clock frequency value in the received request. These algorithms in PCU firmware may calculate, based on a thermal generation model of the processing device, the thermal energy generated by various applications running on processor 102 and may adjust the processor workload to ensure the generated thermal energy does not violate the TDP associated with processor 102. The workload can be adjusted by offloading the task to another processing device or reduce the base clock frequency values of processing cores. Power management circuit 110 may further set up the base clock frequency values for processor 102 and/or one or more processing cores 108. In one embodiment, at 218, power management circuit 110 may expose the target base frequency value on a hardware (or firmware) interface. An example of such a hardware interface might be the CPUID instruction that may expose the base clock frequency value of the processor or a model specific register (MSR) within each processing core that, when read, returns the new base clock frequency value. The exposure of the target base clock frequency can be achieved by making control register 112 and/or control registers 114 (including affinity mask 126) visible to system software 122. This may allow system software 122 to inquire the target base frequency values.

If power management circuit 110 receives the base clock frequency request including the target base clock frequency value for the processor 102 (i.e., all processing cores 108), power management circuit 110 may store the target base clock frequency value in control register 112. Processor 102 (and all processing cores 108) may run according to the target base clock frequency value, where the target base clock frequency value can be higher than the labeled value. If power management circuit 110 receives the base clock frequency request including a set (e.g., fewer than all) of processing cores 108 and their corresponding target base clock frequency values, power management circuit 110 may store these target base clock frequency values in corresponding control registers 114. Power management circuit 110 may also set activity status (e.g., corresponding bits in the affinity mask) associated with the set of processing cores 108 to the active status, allowing them to run at the target base clock frequency values. These target base clock frequency values can be different from (e.g., higher than) the labeled value.

At 220, power management circuit 110 may optionally set other hardware components that may run based on the base clock frequency. For example, power management circuit 110 may set up a timestamp counter (TSC) to run at the target base clock frequency value. Responsive to setting all hardware components to run at the target base clock frequency, at 222, the boot process may continue with other instructions to set up devices other than processor 102.

In another embodiment, system software 122 during operation may also present the selection of usage scenarios for the user to choose. Based on the user selection, system software 122 may, via an API, transmit a base clock frequency request to power management circuit 110 to request a change of the base clock frequency value for processor 102 and/or one or more processing cores 108. Power management circuit 110 may similarly set up processor 102 and/or one or more processing cores 108 to run at the target based clock frequency.

In other embodiments, system software 122 (or, BIOS chipset 106) may transmit the target usage scenario (rather than the base clock frequency request) to power management circuit 110 of processor 102. As shown in FIG. 1, system software 122 (e.g., the operating system or VMM) running on processor 102 may support applications. For example, an operating system may manage the execution of multiple software applications running on processor 102. In a virtualized system, the VMM may support virtual machines (VMs) 124. Each VM 124 may run one or more software applications. System software 122 may monitor software usage scenario associated with processor 102. Software usage scenario may include a number of processing cores in the processor to be used, a thermal design power, a workload (e.g., as a percentage of the TDP), and a reliability measurement. Responsive to determining that a change of the usage scenario associated with processor 102, system software 122 may, via an API, notify to PCU firmware 116 of the change. For example, the change of usage scenario may be caused by the addition (or exit) of one or more VMs, thus increasing (or decreasing) the number of active VMs supported by the VMM. The change may also be caused by installation (or uninstallation) of a software application.

PCU firmware 116 running on power management circuit 110 may use a usage scenario to determine the target base clock frequency value based on the usage scenario and update the base clock frequency of processor 102 and/or one or more processing cores 108 to the target base clock frequency value. Power management circuit 110 may advertise the target base clock frequency value to system software 122. For example, power management circuit 110 may dynamically update the base clock frequency to the target value and generate interrupts to inform system software 122 of the update.

Figure 2B:
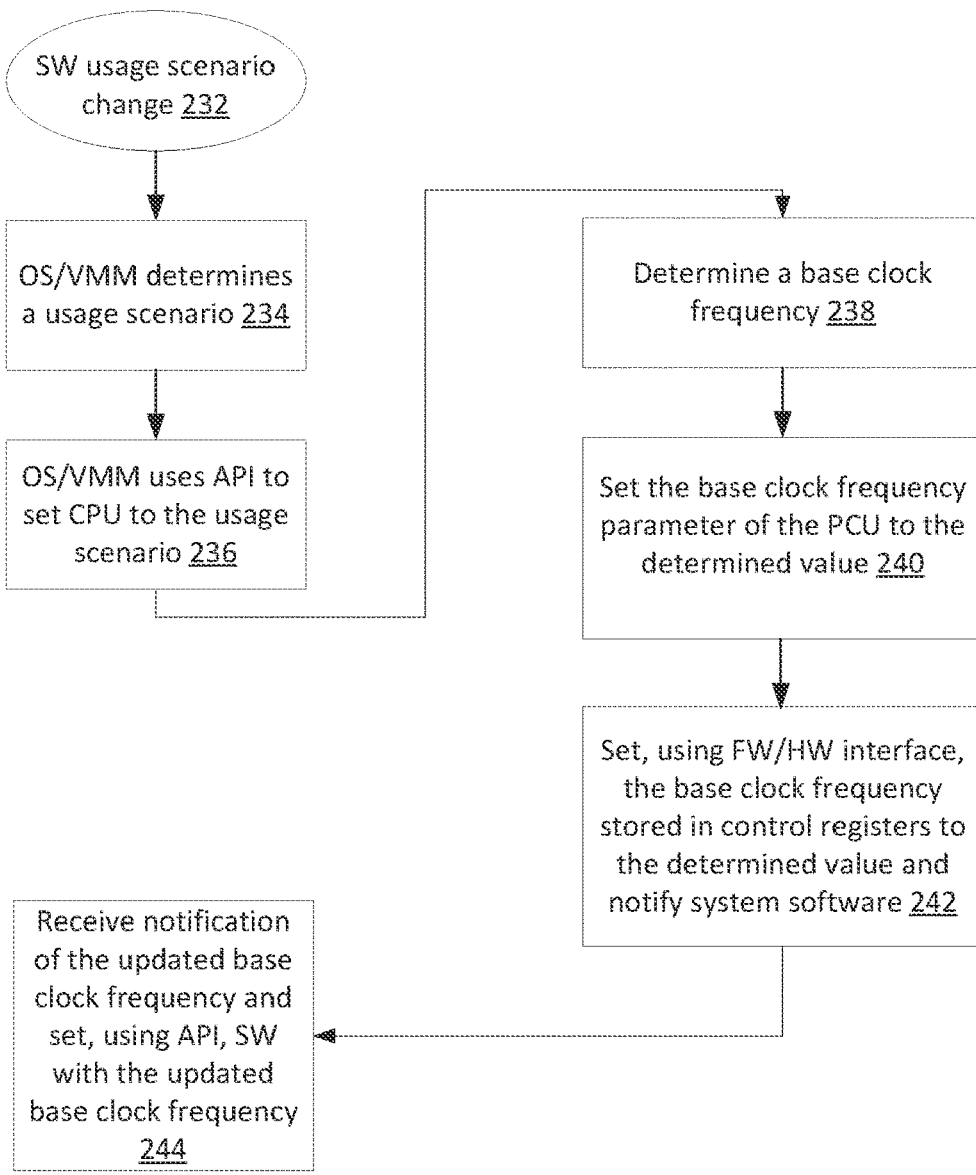
FIG. 2B illustrates a process to change base clock frequency based on usage scenarios during runtime according to an embodiment of the present disclosure.

FIG. 2B illustrates a process 230 to change base clock frequency based on usage scenarios according to an embodiment of the present disclosure. As shown in FIG. 2B, at 232, the usage scenario of processor 102 may change due to a change in the software environment. At 234, responsive to detecting the usage scenario change (e.g., change from a first usage scenario to a second usage scenario), system software 122 may determine a new usage scenario for processor 102. The new usage scenario may specify a target number of processing cores in the processor to be used, a target thermal design power, a target workload (e.g., as a percentage of the TDP), and a target reliability measurement. At 236, system software 122 running on processor 102 may, via an API, transmit the new usage scenario to power management circuit 110, requesting an update of the base clock frequency value for processor 102 and/or one or more processing cores 108.

At 238, power management circuit 110 may receive the new usage scenario and calculate a target base clock frequency value and optionally, a number of processing cores to operate at the target base clock frequency value. Similar to the booting process, at 240, power management circuit 110 may update parameters associated with the PCU firmware 116 to reflect the target base clock frequency value. Thus, PCU firmware 116 may monitor the thermal energy generated by processor 102 based on the target base clock frequency value. At 242, power management circuit 110 may store the power management circuit 110 in control register 112 and/or control registers 114 (including affinity mask 126) associated with those target processing cores 118, thus readying processor 102 and/or one or more processing cores 118 to run at the target base clock frequency value under the new usage scenario. Responsive to making processor 102 ready to run at the target base clock frequency value, power management circuit 110 may, via a hardware (or firmware) interface, notify system software 122 of the base clock frequency value update. In one embodiment, power management circuit 110 may send the notification by triggering an interrupt event that can be trapped by system software 122.

At 244, system software 122 running on processor 102 may receive (e.g., by detecting the interrupt event) the notification of base clock frequency value update. The notification may include the target base clock frequency value at which processor 102 (or a set of processing cores 108) is to run. In this way, system 100 may dynamically change its base clock frequency value based on the usage scenario.

The flexibility to reconfigure the base clock frequency of a processor and/or one or more processing cores therein allows a computing service provider (e.g., a cloud service provider or an enterprise-level service provider) to provide variable levels of services to customers and charge the services accordingly. The computing service provider and customers may agree to a service level agreement (SLA) which is a contract specifying service quality guarantees made by the computing service provider to the customers. The provided service may include the provision of one or more types of software objects such as, for example, virtual machines and virtualized instances of the operating system (referred to as containers). Each one of the software objects may run at a target service level which can be provided by processing cores running at different base clock frequency values. The target service level may also include other parameters such as, for example, the allowable power to be consumed by the software (as a ratio to the TDP), allowable software object instruction mix, allowable reliability/wear rate, and exclusivity to use a processing core. The system software 122 may, via an API, inquire processor 102 to determine whether processor 102 can assure the target service level and store parameters of the target service level in a service level data structure associated with system software 122. In some implementations, the higher the target service level (e.g., the higher target number of processing cores and/or the higher base clock frequency), the higher the cost associated with providing the target service level.

Embodiments of the present disclosure allow computing service providers to increase the base clock frequency values associated with one or more processing cores to satisfy the target service level specified by customers. In one embodiment, system software 122 may determine whether the current service level stored in the service level data structure satisfies a customer's request and if not, the conditions to satisfy the customer's request. Further, responsive to determining that a higher base clock frequency value is needed to satisfy the customer's request, system software 122 may determine whether the base clock frequency value of the processor and/or one or more processing cores can be increased to satisfy the request. In this way, system software 122 may adjust the base clock frequency value associated with processor 102 to satisfy a target service level requested by a customer.

Figure 3:
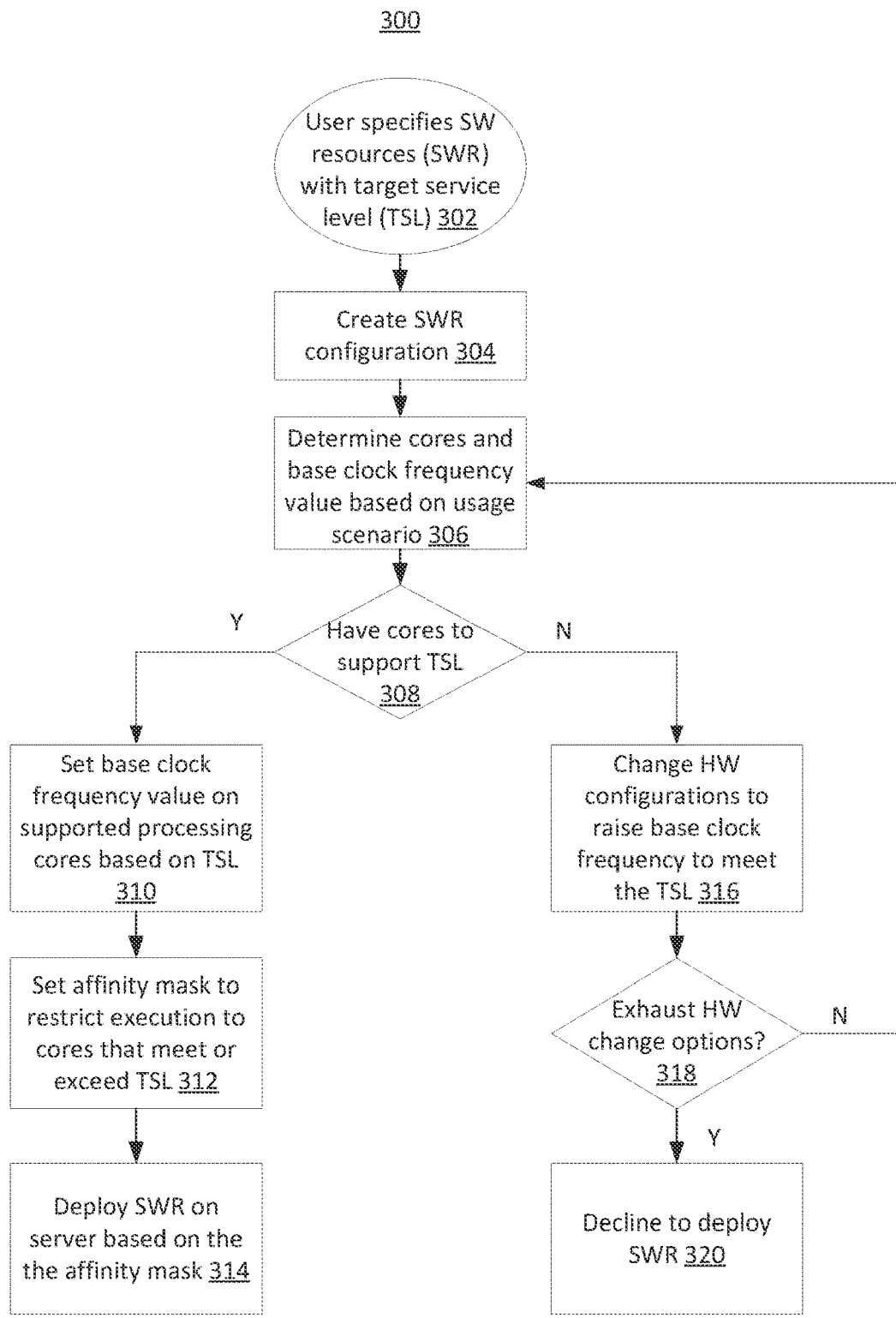
FIG. 3 illustrates a process to adjust the base clock frequency values on some or selective cores to meet a target service level according to an embodiment of the present disclosure.

FIG. 3 illustrates a process 300 to adjust the base clock frequency values to meet a target service level according to an embodiment of the present disclosure. As shown in FIG. 3, at 302, a customer (bound by an SLA with the cloud service provider) may, via a user interface, request a set of software objects (e.g., VMs, containers, and/or processes) and specify a target service level under which the set of software objects run. The target service level may include the time required to accomplish a specific task. Thus, the target service level may be satisfied by utilizing different combinations of processing cores running at different base clock frequency values. At 304, system software 122 executing on processor 102 may generate the set of software objects (e.g., VMs or containers) and store the target service level in the service level data structure. At 306, system software 122 executing on processor 102 may, via an API, determine which available processing cores 108 at their current base clock frequency values can support the target service level stored in the service level data structure.

At 306, system software 122 executing on processor 102 may further determine whether there are enough available processing cores to support the target service level. Responsive to determining that there are enough processing cores 108 to support the target service level requested by the customer, at 310, system software 122 executing on processor 102 may, via the API, notify power management circuit 110 and cause power management circuit 110 to set up these supported processing cores to run at their current base clock frequency values. At 312, system software 122 executing on processor 102 may further execute instructions to set up the affinity mask to restrict services provided to the customer are from these available and capable processing cores identified at 306 and 308. At 314, system software 122 executing on processor 102 may deploy software objects on processor 102 that may run on the identified processing cores according to the affinity mask.

Responsive to determining that there are not enough processing cores to support the target service level requested by the customer, at 316, system software 122 executing on processor 102 may instruct power management circuit 110 to increase the base clock frequency for the available processing cores to a target base clock frequency value, thus meeting the target service level requested by the customer. At 318, power management circuit 110 may determine whether it has exhausted hardware change options to satisfy the target service level. In one embodiment, the determination may be based on the number of times to increase the base clock frequency value has exceeded a threshold value. In another embodiment, the determination may be based on that the increased base clock frequency value reaches an upper limit. If power management circuit 110 determines that hardware change options are not exhausted, power management circuit 110 may notify (e.g., by sending an interrupt event system software 122 to determine whether processor 102 has enough software objects to perform tasks at the target service level. If power management circuit 110 determines that hardware change options are exhausted, at 320, power management circuit 110 may notify (e.g., by sending an interrupt event) to system software 122 to decline the deployment of software objects requested by the customer, or alternatively to offline the software objects to other systems.

FIG. 4 is a block diagram of a method 400 to set the base clock frequency value based on a target service level according to an embodiment of the present disclosure. Method 400 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, method 400 may be performed, in part, by processor 102 and power management circuit 110 as shown in FIG. 1.

For simplicity of explanation, the method 400 is depicted and described as a series of acts. However, acts in accordance with this disclosure can occur in various orders and/or concurrently and with other acts not presented and described herein. Furthermore, not all illustrated acts may be performed to implement the method 400 in accordance with the disclosed subject matter. In addition, those skilled in the art will understand and appreciate that the method 400 could alternatively be represented as a series of interrelated states via a state diagram or events.

Referring to FIG. 4, at 402, processor 102 may receive a specification comprising a target service level associated with a software object, wherein the target service level comprises a first base clock frequency value associated with a plurality of processing cores of the processing device.

At 404, processor 102 may determine whether there are enough processing cores in the processor available to support the target service level.

At 406, responsive to determining that the processing device does not have enough support, processor 102 may transmit a request, to a power management circuit of the processing device, to cause the available processing cores to run at a second base clock frequency value that is higher than the first base clock frequency value.

Figure 5A:
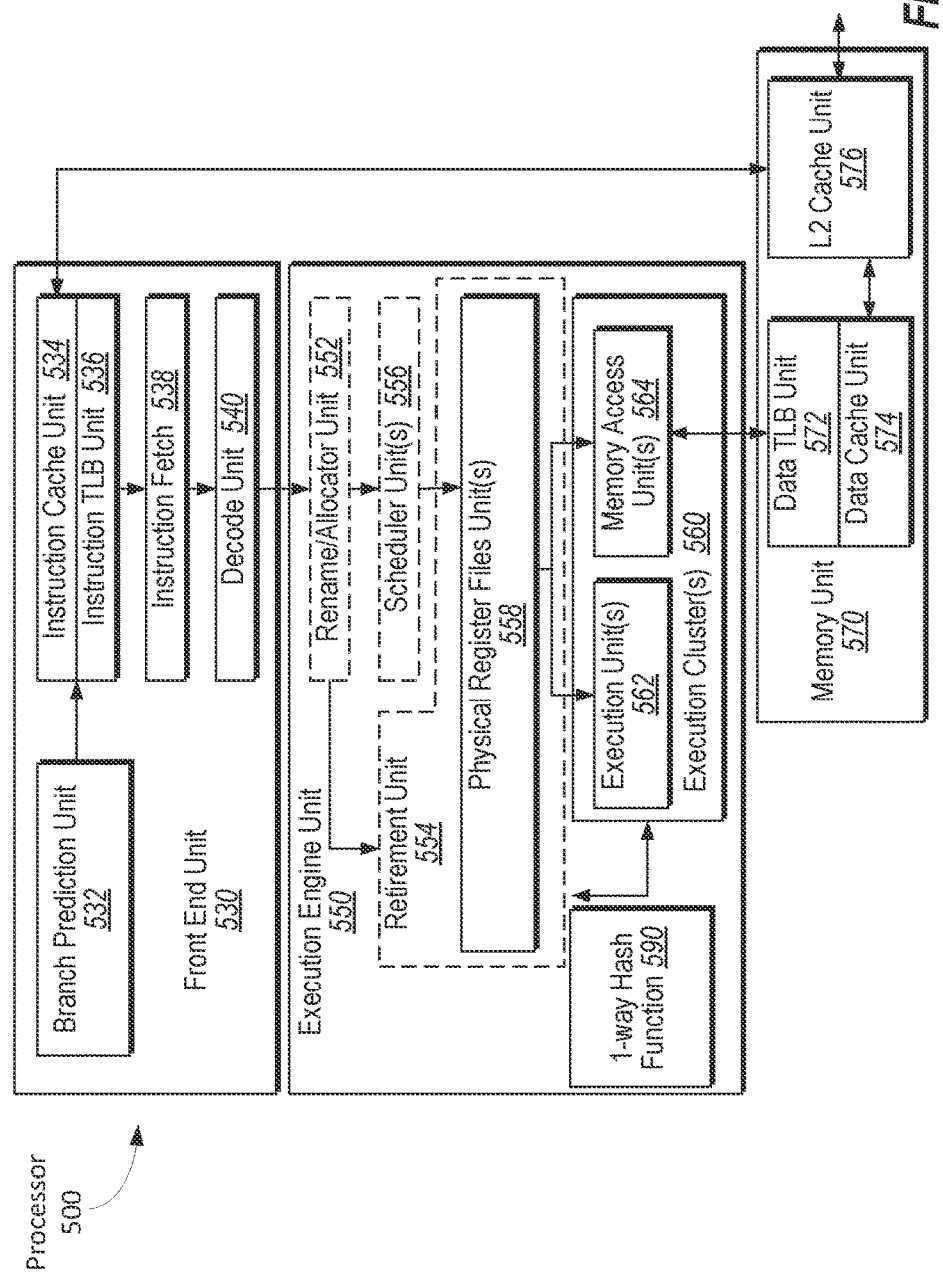
FIG. 5A is a block diagram illustrating a micro-architecture for a processor including heterogeneous core in which one embodiment of the disclosure may be used.

FIG. 5A is a block diagram illustrating a micro-architecture for a processor 500 that implements the processing device including heterogeneous cores in accordance with one embodiment of the disclosure. Specifically, processor 500 depicts an in-order architecture core and a register renaming logic, out-of-order issue/execution logic to be included in a processor according to at least one embodiment of the disclosure.

Processor 500 includes a front end unit 530 coupled to an execution engine unit 550, and both are coupled to a memory unit 570. The processor 500 may include a reduced instruction set computing (RISC) core, a complex instruction set computing (CISC) core, a very long instruction word (VLIW) core, or a hybrid or alternative core type. As yet another option, processor 500 may include a special-purpose core, such as, for example, a network or communication core, compression engine, graphics core, or the like. In one embodiment, processor 500 may be a multi-core processor or may be part of a multi-processor system.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 540 may be implemented using various different mechanisms. Examples of suitable mechanisms include, but are not limited to, look-up tables, hardware implementations, programmable logic arrays (PLAs), microcode read only memories (ROMs), etc. The instruction cache unit 534 is further coupled to the memory unit 570. The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations (RS), central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 558 is overlapped by the retirement unit 554 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

In one implementation, processor 500 may be the same as processor 102 described with respect to FIG. 1. In particular, processor 500 may include the power management circuit 110 that is to set the base clock frequency values for processing cores 108 as shown in FIG. 1.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which may include a data prefetcher 580, a data TLB unit 572, a data cache unit (DCU) 574, and a level 2 (L2) cache unit 576, to name a few examples. In some embodiments DCU 574 is also known as a first level data cache (L1 cache). The DCU 574 may handle multiple outstanding cache misses and continue to service incoming stores and loads. It also supports maintaining cache coherency. The data TLB unit 572 is a cache used to improve virtual address translation speed by mapping virtual and physical address spaces. In one exemplary embodiment, the memory access units 564 may include a load unit, a store address unit, and a store data unit, each of which is coupled to the data TLB unit 572 in the memory unit 570. The L2 cache unit 576 may be coupled to one or more other levels of cache and eventually to a main memory.

In one embodiment, the data prefetcher 580 speculatively loads/prefetches data to the DCU 574 by automatically predicting which data a program is about to consume. Prefeteching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 500 may support one or more instructions sets (e.g., the x86 instruction set (with some extensions that have been added with newer versions)); the MIPS instruction set of MIPS Technologies of Sunnyvale, CA; the ARM instruction set (with optional additional extensions such as NEON) of ARM Holdings of Sunnyvale, CA).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 5B:
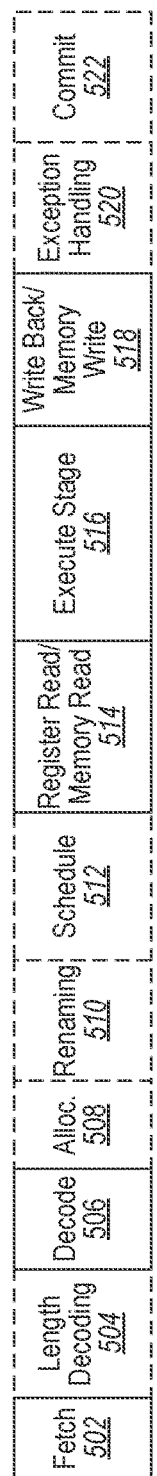
FIG. 5B is a block diagram illustrating an in-order pipeline and a register renaming stage, out-of-order issue/execution pipeline implemented according to at least one embodiment of the disclosure.

FIG. 5B is a block diagram illustrating an in-order pipeline and a register renaming stage, out-of-order issue/execution pipeline implemented by processor 500 of FIG. 5A according to some embodiments of the disclosure. The solid lined boxes in FIG. 5B illustrate an in-order pipeline, while the dashed lined boxes illustrates a register renaming, out-of-order issue/execution pipeline. In FIG. 5B, processor 500 as a pipeline, includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. In some embodiments, the ordering of stages 502-524 may be different than illustrated and are not limited to the specific ordering shown in FIG. 5B.

FIG. 6 illustrates a block diagram of the micro-architecture for a processor 600 that includes hybrid cores in accordance with one embodiment of the disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 601 is the part of the processor 600 that fetches instructions to be executed and prepares them to be used later in the processor pipeline.

The front end 601 may include several units. In one embodiment, the instruction prefetcher 626 fetches instructions from memory and feeds them to an instruction decoder 628 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 630 takes decoded uops and assembles them into program ordered sequences or traces in the uop queue 634 for execution. When the trace cache 630 encounters a complex instruction, the microcode ROM 632 provides the uops needed to complete the operation.

Some instructions are converted into a single micro-op, whereas others need several micro-ops to complete the full operation. In one embodiment, if more than four micro-ops are needed to complete an instruction, the decoder 628 accesses the microcode ROM 632 to do the instruction. For one embodiment, an instruction can be decoded into a small number of micro-ops for processing at the instruction decoder 628. In another embodiment, an instruction can be stored within the microcode ROM 632 should a number of micro-ops be needed to accomplish the operation. The trace cache 630 refers to an entry point programmable logic array (PLA) to determine a correct micro-instruction pointer for reading the micro-code sequences to complete one or more instructions in accordance with one embodiment from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606, determine when a uop is ready to execute based on the readiness of their dependent input register operand sources and the availability of the execution resources the uops need to complete their operation. The fast scheduler 602 of one embodiment can schedule on each half of the main clock cycle while the other schedulers can only schedule once per main processor clock cycle. The schedulers arbitrate for the dispatch ports to schedule uops for execution.

Register files 608, 610, sit between the schedulers 602, 604, 606, and the execution units 612, 614, 616, 618, 620, 622, 624 in the execution block 611. There is a separate register file 608, 610, for integer and floating point operations, respectively. Each register file 608, 610, of one embodiment also includes a bypass network that can bypass or forward just completed results that have not yet been written into the register file to new dependent uops. The integer register file 608 and the floating point register file 610 are also capable of communicating data with the other. For one embodiment, the integer register file 608 is split into two separate register files, one register file for the low order 32 bits of data and a second register file for the high order 32 bits of data. The floating point register file 610 of one embodiment has 128 bit wide entries because floating point instructions typically have operands from 64 to 128 bits in width.

The execution block 611 contains the execution units 612, 614, 616, 618, 620, 622, 624, where the instructions are actually executed. This section includes the register files 608, 610, that store the integer and floating point data operand values that the micro-instructions need to execute. The processor 600 of one embodiment is comprised of a number of execution units: address generation unit (AGU) 612, AGU 614, fast ALU 616, fast ALU 618, slow ALU 620, floating point ALU 622, floating point move unit 624. For one embodiment, the floating point execution blocks 622, 624, execute floating point, MMX, SIMD, and SSE, or other operations. The floating point ALU 622 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 616, 618. The fast ALUs 616, 618, of one embodiment can execute fast operations with an effective latency of half a clock cycle. For one embodiment, most complex integer operations go to the slow ALU 620 as the slow ALU 620 includes integer execution hardware for long latency type of operations, such as a multiplier, shifts, flag logic, and branch processing. Memory load/store operations are executed by the AGUs 612, 614. For one embodiment, the integer ALUs 616, 618, 620, are described in the context of performing integer operations on 64 bit data operands. In alternative embodiments, the ALUs 616, 618, 620, can be implemented to support a variety of data bits including 16, 32, 128, 256, etc. Similarly, the floating point units 622, 624, can be implemented to support a range of operands having bits of various widths. For one embodiment, the floating point units 622, 624, can operate on 128 bits wide packed data operands in conjunction with SIMD and multimedia instructions.

In one embodiment, the uops schedulers 602, 604, 606, dispatch dependent operations before the parent load has finished executing. As uops are speculatively scheduled and executed in processor 600, the processor 600 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 600 also includes logic to implement store address prediction for memory disambiguation according to embodiments of the disclosure. In one embodiment, the execution block 611 of processor 600 may include a store address predictor (not shown) for implementing store address prediction for memory disambiguation.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, California. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Referring now to FIG. 7, shown is a block diagram illustrating a system 700 in which an embodiment of the disclosure may be used. As shown in FIG. 7, multiprocessor system 700 is a point-to-point interconnect system, and includes a first processor 770 and a second processor 780 coupled via a point-to-point interconnect 750. While shown with only two processors 770, 780, it is to be understood that the scope of embodiments of the disclosure is not so limited. In other embodiments, one or more additional processors may be present in a given processor. In one embodiment, the multiprocessor system 700 may implement hybrid cores as described herein.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
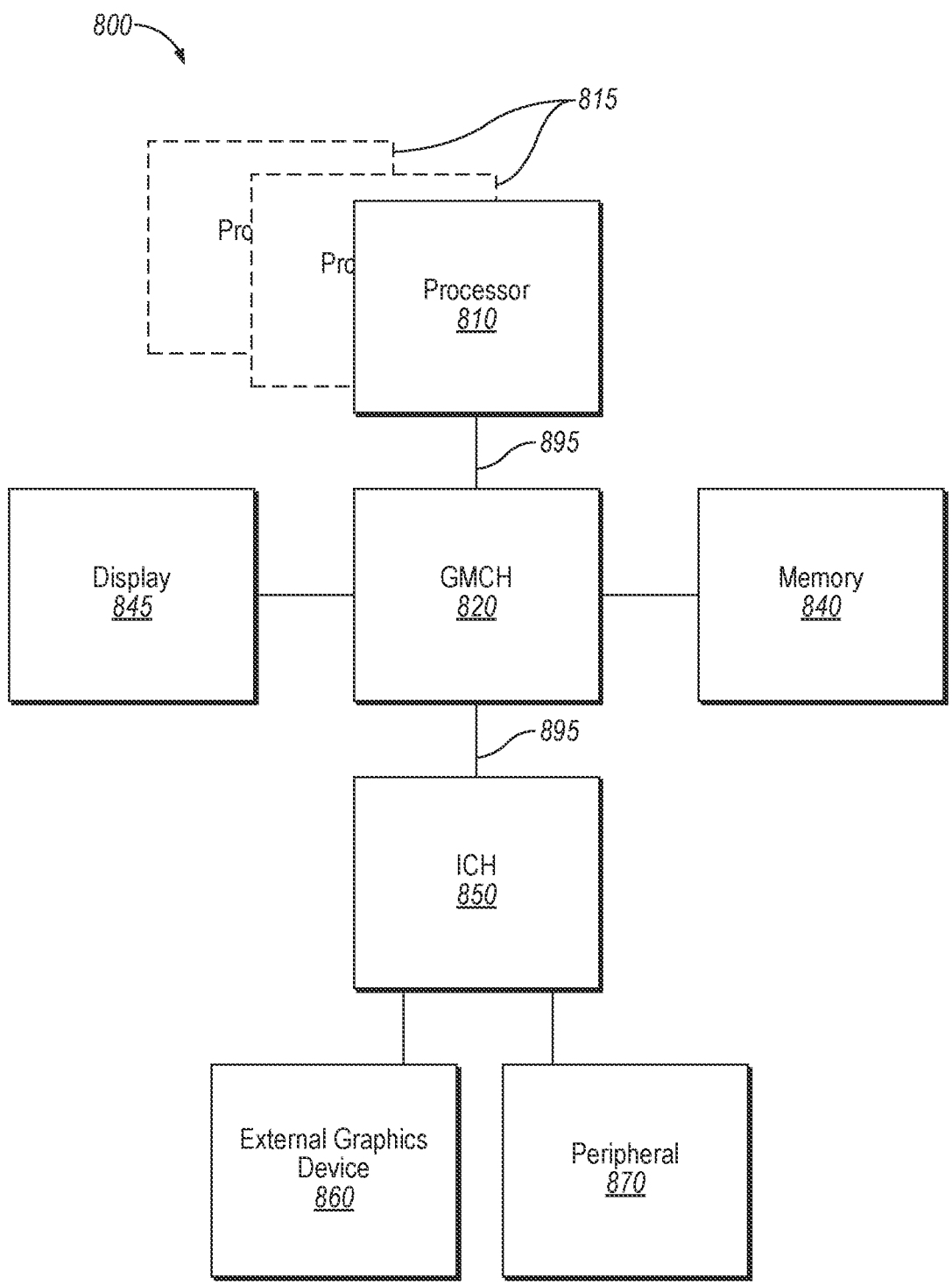
FIG. 8 is a block diagram of a system in which an embodiment of the disclosure may operate.

Referring now to FIG. 8, shown is a block diagram of a system 800 in which one embodiment of the disclosure may operate. The system 800 may include one or more processors 810, 815, which are coupled to graphics memory controller hub (GMCH) 820. The optional nature of additional processors 815 is denoted in FIG. 8 with broken lines. In one embodiment, processors 810, 815 implement hybrid cores according to embodiments of the disclosure.

Each processor 810, 815 may be some version of the circuit, integrated circuit, processor, and/or silicon integrated circuit as described above. However, it should be noted that it is unlikely that integrated graphics logic and integrated memory control units would exist in the processors 810, 815. FIG. 8 illustrates that the GMCH 820 may be coupled to a memory 840 that may be, for example, a dynamic random access memory (DRAM). The DRAM may, for at least one embodiment, be associated with a non-volatile cache.

The GMCH 820 may be a chipset, or a portion of a chipset. The GMCH 820 may communicate with the processor(s) 810, 815 and control interaction between the processor(s) 810, 815 and memory 840. The GMCH 820 may also act as an accelerated bus interface between the processor(s) 810, 815 and other elements of the system 800. For at least one embodiment, the GMCH 820 communicates with the processor(s) 810, 815 via a multi-drop bus, such as a frontside bus (FSB) 895.

Furthermore, GMCH 820 is coupled to a display 845 (such as a flat panel or touchscreen display). GMCH 820 may include an integrated graphics accelerator. GMCH 820 is further coupled to an input/output (I/O) controller hub (ICH) 850, which may be used to couple various peripheral devices to system 800. Shown for example in the embodiment of FIG. 8 is an external graphics device 860, which may be a discrete graphics device, coupled to ICH 850, along with another peripheral device 870.

Alternatively, additional or different processors may also be present in the system 800. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There can be a variety of differences between the processor(s) 810, 815 in terms of a spectrum of metrics of merit including architectural, micro-architectural, thermal, power consumption characteristics, and the like. These differences may effectively manifest themselves as asymmetry and heterogeneity amongst the processors 810, 815. For at least one embodiment, the various processors 810, 815 may reside in the same die package.

Figure 9:
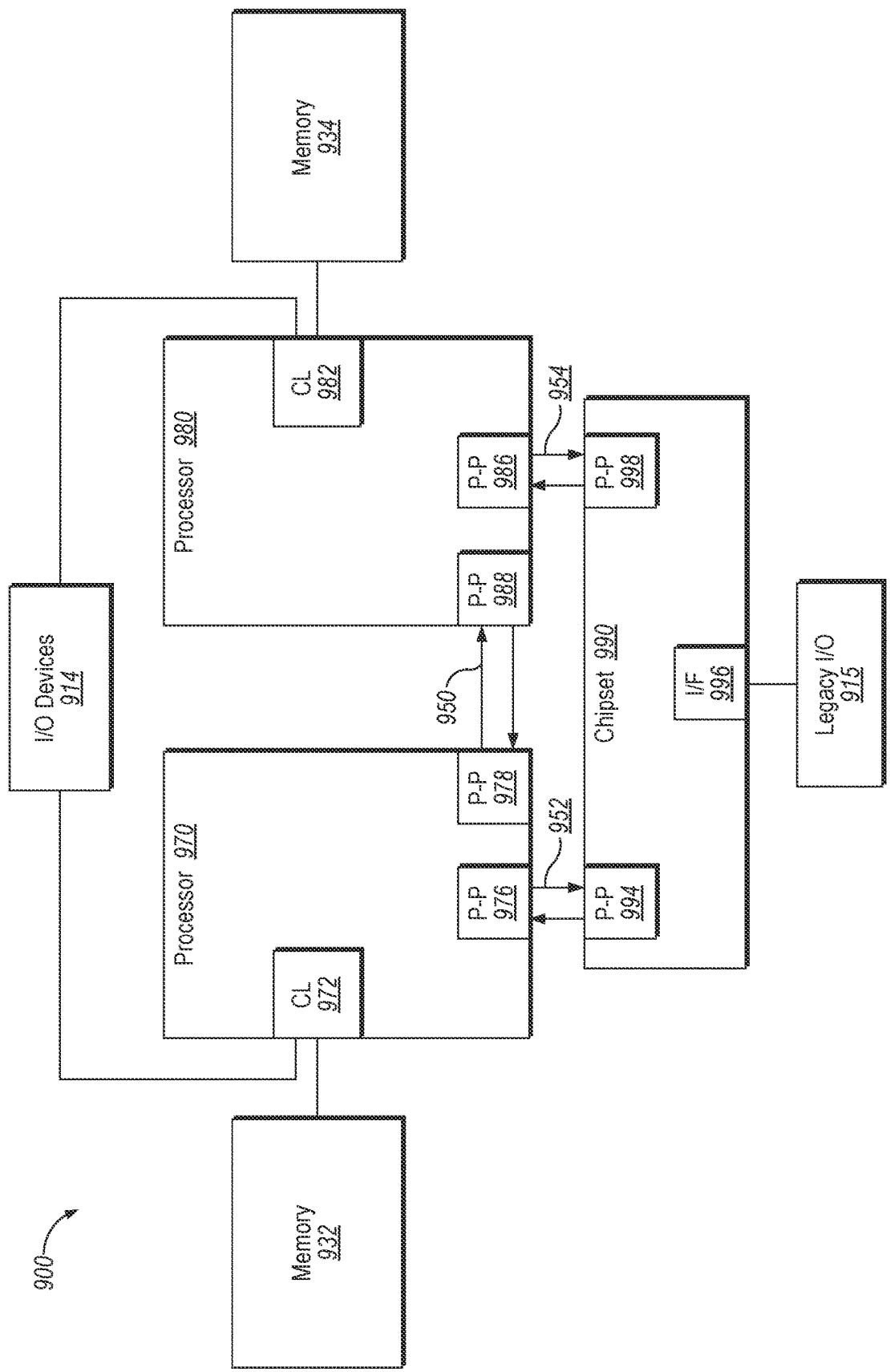
FIG. 9 is a block diagram of a system in which an embodiment of the disclosure may operate.

Referring now to FIG. 9, shown is a block diagram of a system 900 in which an embodiment of the disclosure may operate. FIG. 9 illustrates processors 970, 980. In one embodiment, processors 970, 980 may implement hybrid cores as described above. Processors 970, 980 may include integrated memory and I/O control logic ("CL") 972 and 982, respectively and intercommunicate with each other via point-to-point interconnect 950 between point-to-point (P-P) interfaces 978 and 988 respectively. Processors 970, 980 each communicate with chipset 990 via point-to-point interconnects 952 and 954 through the respective P-P interfaces 976 to 994 and 986 to 998 as shown. For at least one embodiment, the CL 972, 982 may include integrated memory controller units. CLs 972, 982 may include I/O control logic. As depicted, memories 932, 934 coupled to CLs 972, 982 and I/O devices 914 are also coupled to the control logic 972, 982. Legacy I/O devices 915 are coupled to the chipset 990 via interface 996.

Figure 10:
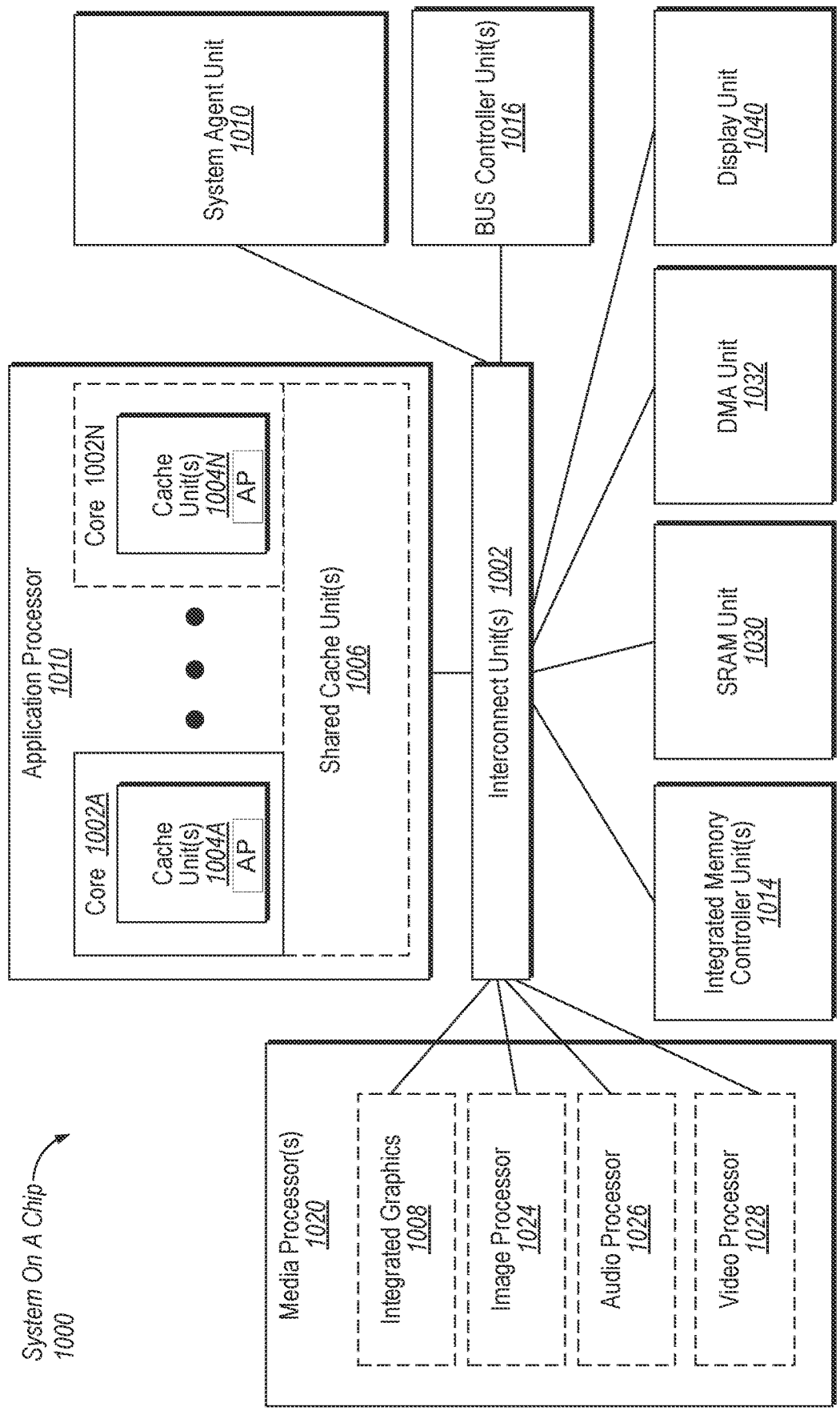
FIG. 10 is a block diagram of a System-on-a-Chip (SoC) in accordance with an embodiment of the present disclosure.

Embodiments may be implemented in many different system types. FIG. 10 is a block diagram of an SoC 1000 in accordance with an embodiment of the present disclosure. Dashed lined boxes are optional features on more advanced SoCs. In some implementations, SoC 1000 as shown in FIG. 10 includes features of the SoC 100 as shown in FIG. 1. In FIG. 10, an interconnect unit(s) 1012 is coupled to: an application processor 1020 which includes a set of one or more cores 1002A-N and shared cache unit(s) 1006; a system agent unit 1010; a bus controller unit(s) 1016; an integrated memory controller unit(s) 1014; a set of one or more media processors 1018 which may include integrated graphics logic 1008, an image processor 1024 for providing still and/or video camera functionality, an audio processor 1026 for providing hardware audio acceleration, and a video processor 1028 for providing video encode/decode acceleration; a static random access memory (SRAM) unit 1030; a direct memory access (DMA) unit 1032; and a display unit 1040 for coupling to one or more external displays. In one embodiment, a memory module may be included in the integrated memory controller unit(s) 1014. In another embodiment, the memory module may be included in one or more other components of the SoC 1000 that may be used to access and/or control a memory. The application processor 1020 may include a store address predictor for implementing hybrid cores as described in embodiments herein.

The memory hierarchy includes one or more levels of cache within the cores, a set of one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof.

In some embodiments, one or more of the cores 1002A-N are capable of multithreading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture and/or instruction set. For example, some of the cores 1002A-N may be in order while others are out-of-order. As another example, two or more of the cores 1002A-N may be capable of execution the same instruction set, while others may be capable of executing only a subset of that instruction set or a different instruction set.

The application processor 1020 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1020 may be from another company, such as ARM Holdings™, Ltd, MIPS™, etc. The application processor 1020 may be a special-purpose processor, such as, for example, a network or communication processor, compression engine, graphics processor, co-processor, embedded processor, or the like. The application processor 1020 may be implemented on one or more chips. The application processor 1020 may be a part of and/or may be implemented on one or more substrates using any of a number of process technologies, such as, for example, BiCMOS, CMOS, or NMOS.

Figure 11:
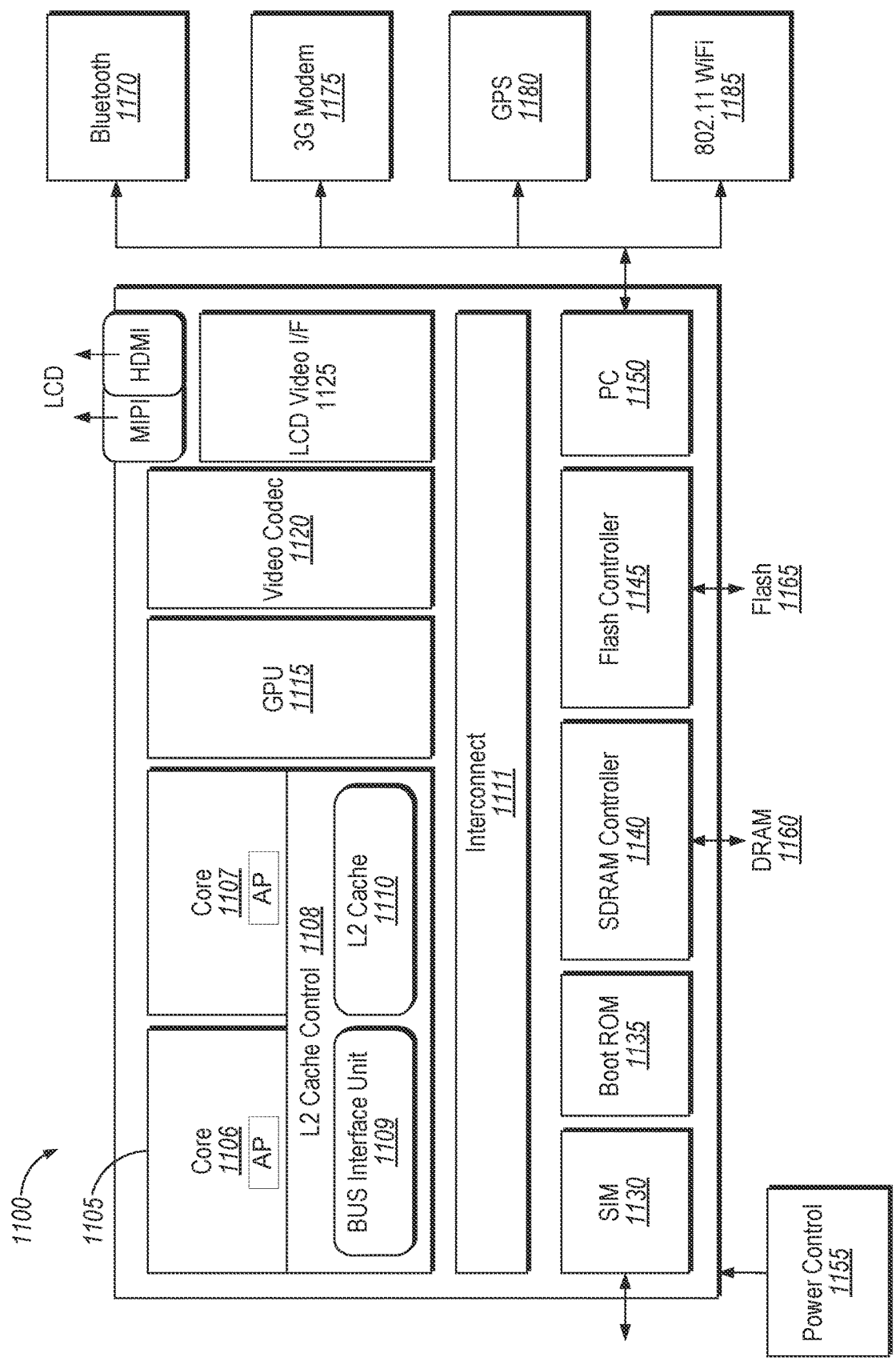
FIG. 11 is a block diagram of an embodiment of an SoC design in accordance with the present disclosure.

FIG. 11 is a block diagram of an embodiment of a system on-chip (SoC) design in accordance with the present disclosure. As a specific illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1100 includes 2 cores—1106 and 1107. Cores 1106 and 1107 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1110 includes an on-chip interconnect, such as an IOSF, AMBA, or other interconnect discussed above, which potentially implements one or more aspects of the described disclosure. In one embodiment, cores 1106, 1107 may implement hybrid cores as described in embodiments herein.

Interconnect 1110 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the disclosure described herein. In addition, the system 1100 illustrates peripherals for communication, such as a Bluetooth module 1170, 3G modem 1175, GPS 1180, and Wi-Fi 1185.

Figure 12:
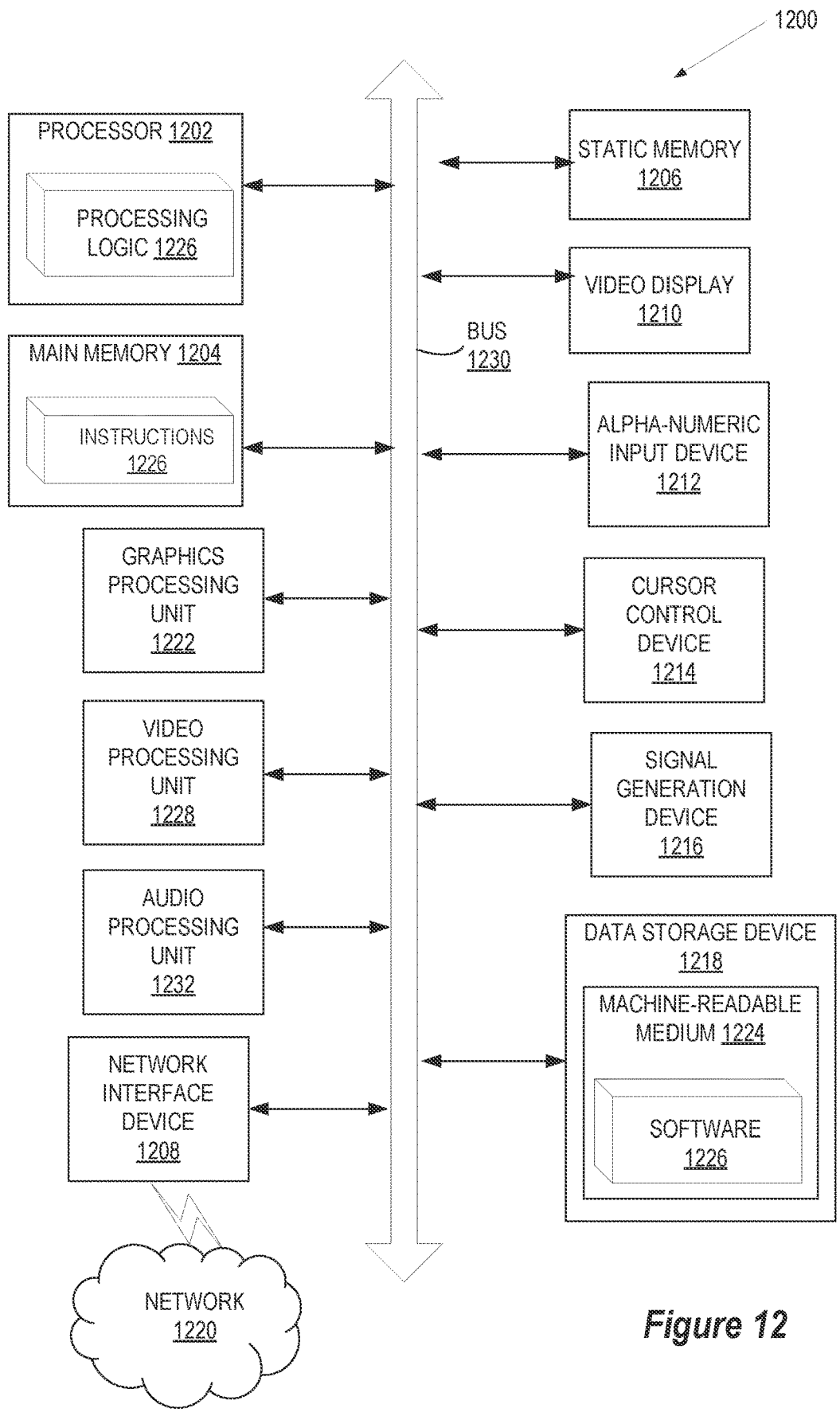
FIG. 12 illustrates a block diagram of one embodiment of a computer system.

FIG. 12 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or more processing cores. The processing device 1202 is configured to execute the processing logic 1226 for performing the operations and steps discussed herein. In one embodiment, processing device 1202 is the same as processor architecture 100 described with respect to FIG. 1 as described herein with embodiments of the disclosure.

The computer system 1200 may further include a network interface device 1208 communicably coupled to a network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker). Furthermore, computer system 1200 may include a graphics processing unit 1222, a video processing unit 1228, and an audio processing unit 1232.

The data storage device 1218 may include a machine-accessible storage medium 1224 on which is stored software 1226 implementing any one or more of the methodologies of functions described herein, such as implementing store address prediction for memory disambiguation as described above. The software 1226 may also reside, completely or at least partially, within the main memory 1204 as instructions 1226 and/or within the processing device 1202 as processing logic 1226 during execution thereof by the computer system 1200; the main memory 1204 and the processing device 1202 also constituting machine-accessible storage media.

The machine-readable storage medium 1224 may also be used to store instructions 1226 implementing store address prediction for hybrid cores such as described according to embodiments of the disclosure. While the machine-accessible storage medium 1128 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present disclosure. The term "machine-accessible storage medium" shall accordingly be taken to include, but not be limited to, solid-state memories, and optical and magnetic media.

The following examples pertain to further embodiments. Example 1 is a processor including a plurality of processing cores, a control register, associated with a first processing core of the plurality of processing cores, to store a first base clock frequency value at which the first processing core is to run, and a power management circuit to receive a base clock frequency request comprising a second base clock frequency value, store the second base clock frequency value in the control register to cause the first processing core to run at the second base clock frequency value, and expose the second base clock frequency value on a hardware interface associated with the power management circuit.

In Example 2, the subject matter of Example 1 can further provide that the first base clock frequency value and the second base clock frequency value are clock speeds at which the processing device is to perform at a pre-determined level of workload within a thermal design power (TDP) limit of the processing device.

In Example 3, the subject matter of Example 1 can further provide that the second base clock frequency value is different than the first base clock frequency value.

In Example 4, the subject matter of Example 1 can further provide that the power management circuit is to receive the base clock frequency request from at least one of a controller executing a basic input/output system (BIOS) instruction or from a system software application executing on the processing device.

In Example 5, the subject matter of any of Examples 1 and 4 can further provide that the controller executing the BIOS instruction is to display, on an output device, a plurality of usage scenarios, wherein a usage scenario is to specify at least one of a number of processing cores to be used, a target base clock frequency value at which a processing core is to operate, a target workload, or a target reliability metric, responsive to receiving a selection of one of the plurality of usage scenarios, determine, based on the selected usage scenario, the second base clock frequency value, and transmit, to the power management circuit, the base clock frequency request comprising the second base clock frequency value.

In Example 6, the subject matter of any of Examples 1 and 4 can further provide that the controller executing the BIOS instruction is to transmit, to the power management circuit, the base clock frequency request comprising the second base clock frequency value and an identifier associated with the first processing core.

In Example 7, the subject matter of any of Examples 1 and 4 can further provide that the system software application is one of an operating system or a virtual machine monitor (VMM), and wherein the processing device is to execute system software to detect a second usage scenario associated with the processing device, determine, based on the second usage scenario, the second base clock frequency value, and transmit, to the power management circuit, the base clock frequency request comprising the second base clock frequency value.

In Example 8, the subject matter of any of Examples 1 and 4 can further provide that the processing device is to execute the system software application to retrieve the second base clock frequency value via the hardware interface.

In Example 9, the subject matter of Example 1 can further include a second control register to store an affinity mask comprising a bit flag representing an activity status of the first processing core, and wherein responsive to storing the second base clock frequency value in the control register, the power management circuit is to set the bit flag to an active status.

In Example 10, the subject matter of Example 1 can further provide that responsive to receiving the base clock frequency request, the power management circuit is to run power control firmware according to the second base clock value.

In Example 11, the subject matter of Example 1 can further provide that the control register is associated with the processing device to store the first base clock frequency value at which the plurality of processing cores are to run.

In Example 12, the subject matter of Example 1 can further include a second control register to store a reference to a data structure stored in a memory, wherein the data structure is to store the first base clock frequency value at which the plurality of processing cores are to run.

Example 13 is a system including a basic input/output system (BIOS) chipset to store BIOS instructions, a processing device comprising a plurality of processing cores, a control register, associated with a first processing core of the plurality of processing cores, to store a first base clock frequency value at which the first processing core is to run, and a power management circuit to calculate to receive a usage scenario of the processing device, determine, based on the usage scenario, a second base clock frequency value, store the second base clock frequency value in the control register to cause the first processing core to run at the second base clock frequency value, and expose the second base clock frequency value on a hardware interface associated with the power management circuit.

In Example 14, the subject matter of Example 13 can further provide that the second base clock frequency value is different than the first base clock frequency value.

In Example 15, the subject matter of Example 13 can further provide that the power management circuit is to receive the base clock frequency request from at least one of a controller executing a basic input/output system (BIOS) instruction or from a system software application executing on the processing device.

In Example 16, the subject matter of any of Examples 13 and 15 can further provide that the system software application is one of an operating system or a virtual machine monitor (VMM), and wherein the processing device is to execute the system software application to retrieve the second base clock frequency value via the hardware interface.

In Example 17, the subject matter of Example 13 can further provide that the control register is associated with the processing device to store the first base clock frequency value at which the plurality of processing cores are to run.

In Example 18, the subject matter of Example 13 can further provide that the processing device further comprises a second control register to store a reference to a data structure stored in a memory, wherein the data structure is to store the first base clock frequency value at which the plurality of processing cores are to run.

Example 19 is a method including receiving, by a processing device, a specification comprising a target service level associated with a software object, wherein the target service level comprises a first base clock frequency value associated with a plurality of processing cores of the processing device, determining whether the processing device comprises enough processing cores available to support the target service level, and responsive to determining that the processing device does not have enough processing cores available to support the target service level, transmitting a request, to a power management circuit of the processing device, to cause the available processing cores to run at a second base clock frequency value that is higher than the first base clock frequency value.

In Example 20, the subject matter of Example 19 can further provide that the software object is one of a virtual machine or a container object.

Example 21 is an apparatus comprising: means for performing the method of any of Examples 19 and 20.

Example 22 is a machine-readable non-transitory medium having stored thereon program code that, when executed, performs operations comprising receiving, by a processing device, a specification comprising a target service level associated with a software object, wherein the target service level comprises a first base clock frequency value associated with a plurality of processing cores of the processing device, determining whether the processing device comprises enough processing cores available to support the target service level, and responsive to determining that the processing device does not have enough processing cores available to support the target service level, transmitting a request, to a power management circuit of the processing device, to cause the available processing cores to run at a second base clock frequency value that is higher than the first base clock frequency value.

In Example 23, the subject matter of Example 22 can further provide that the software object is one of a virtual machine or a container object.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and/or 'operable to,' in one embodiment, refers to some apparatus, logic, hardware, and/or element designed in such a way to enable use of the apparatus, logic, hardware, and/or element in a specified manner. Note as above that use of 'to,' 'capable of/to,' and/or 'operable to,' in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A multi-core processor comprising:
a plurality of processing cores;
a plurality of control registers, each control register of the plurality of control registers associated with a corresponding processing core;
the plurality of control registers to store a corresponding plurality of values to indicate a per-core clock frequency for corresponding processing cores, the plurality of values initially comprising a plurality of default values to indicate a default per-core clock frequency for a corresponding processing core, the plurality of default values determined during manufacture of the multi-core processor;
execution circuitry to execute software or firmware to indicate a target service level for one or more virtual machines or containers, the target service level associated with target per-core clock frequencies for one or more processing cores of the plurality of processing cores, the target per-core clock frequencies different from corresponding default per-core clock frequencies;
power management circuitry to execute power management firmware to control clock frequencies of the processing cores based, at least in part, on the plurality of values, the power management circuitry to:
receive a plurality of target values associated with the target per-core clock frequencies,
store the plurality of target values in corresponding control registers of the plurality of control registers, each target value to indicate a target per-core clock frequency for a corresponding processing core of the plurality of processing cores,
cause each corresponding processing core of the plurality of processing cores to run at the corresponding target per-core clock frequency, and
expose the plurality of target values to software.

2. The processor of claim 1, wherein the default values and the target values are clock speeds at which the processor is to perform at a pre-determined level of workload within a thermal design power (TDP) limit of the processor.

3. The processor of claim 1, wherein the target values and corresponding target per-core clock frequencies are different than the default values and corresponding default per-core clock frequency, respectively.

4. The processor of claim 1, wherein the power management circuitry is to expose the target values on a hardware interface.

5. The processor of claim 4, wherein the power management circuitry is to receive the target values from at least one of a controller executing a basic input/output system (BIOS) instruction or from a system software application executing on the processor.

6. The processor of claim 4, wherein the processor is to execute a system software application to retrieve the target values via the hardware interface.

7. The processor of claim 1, wherein the plurality of control registers include model specific registers (MSRs), wherein an individual MSR of the MSRs is associated with each of the processing cores.

8. The processor of claim 1, wherein the power management circuitry is to adjust one or more workloads on the processor to ensure that generated thermal energy does not violate a thermal design power (TDP) associated with the processor.

9. The processor of claim 8, wherein the power management circuitry is to adjust the one or more workloads by offloading a task to another processor or reducing the target per-core clock frequencies.

10. The processor of claim 1, wherein at least one of the plurality of processing cores is to be run at a first per-core clock frequency and at least one other of the plurality of processing cores is to be run at a second per-core clock frequency.

11. The processor of claim 1, further comprising a register to store a bit map, where each bit of the bit map stores an activity status for a corresponding processing core.

12. The processor of claim 1, wherein the power management circuitry is to shut down one or more inactive processing cores of the plurality of processing cores and divert resulting spare power to active processing cores of the plurality of processing cores, including the corresponding processing cores of the plurality of processing cores running at the target per-core clock frequencies.

13. The processor of claim 1, wherein receiving the target values and exposing the target values to software comprises executing commands of an interface exposed by the processor.

14. The processor of claim 1, wherein the target service level and the one or more virtual machines or containers are associated with a customer of a cloud service provider.

15. The processor of claim 1, wherein the target service level further indicates one or more of: an allowable power consumption by the virtual machines or containers, an allowable software object instruction mix, an allowable reliability or wear rate, exclusivity of use of the one or more processing cores, and an allowable amount of time for accomplishing a task.

16. A processor comprising:
a plurality of processing cores;
each one of the processing cores associated with a respective control register to store per-core base clock frequency values for a corresponding processing core of the plurality of processing cores,
the per-core base clock frequency values initially comprising default per-core base clock frequency values determined by a manufacturer of the processor;
execution circuitry to execute software or firmware to indicate a target service level for one or more virtual machines or containers, the target service level associated with target per-core base clock frequency values for one or more processing cores of the plurality of processing cores, the target per-core base clock frequency values different from corresponding default per-core base clock frequency values; and
a power management circuit to execute power control unit, PCU, firmware to control clock frequencies of the plurality of processing cores based, at least in part, on the target per-core base clock frequency values, the power management circuit to:
store the target per-core base clock frequency values in corresponding control registers, each target per-core base clock frequency value to cause a corresponding processing core of the plurality of processing cores to run according to the target per-core base clock frequency value; and
expose the target per-core base clock frequency values to software.

17. The processor of claim 16, wherein the default per-core base clock frequency values and the target per-core base clock frequency values are clock speeds at which the processor is to perform at a pre-determined level of workload within a thermal design power, TDP, limit of the processor.

18. The processor of claim 16, wherein the target per-core base clock frequency values are different than the default per-core base clock frequency values.

19. The processor of claim 16, wherein the power management circuit is to expose the target per-core base clock frequency values on a hardware interface.

20. The processor of claim 19, wherein the power management circuit is to receive the target per-core base clock frequency values from at least one of a controller executing a basic input/output system, BIOS, instruction or from a system software application executing on the processor.

21. The processor of claim 19, wherein the processor is to execute a system software application to retrieve the target per-core base clock frequency values via the hardware interface.

22. The processor of claim 16, wherein the corresponding control registers include model specific registers, MSRs, wherein an individual MSR of the MSRs is associated with each core of the plurality of processing cores.

23. The processor of claim 16, wherein the power management circuit is to adjust one or more workloads on the processor to ensure that generated thermal energy does not violate a thermal design power, TDP, associated with the processor.

24. The processor of claim 23, wherein the power management circuit is to adjust the one or more workloads by offloading a task to another processor or reducing the target per-core base clock frequency values.

25. The processor of claim 16, wherein at least one of the plurality of processing cores is to be run at a first per-core base clock frequency and at least one other of the plurality of processing cores is to be run at a second per-core base clock frequency.

26. The processor of claim 16, further comprising a register to store a bit map, where each bit of the bit map stores an activity status for a corresponding processing core.

27. The processor of claim 16, wherein the power management circuit is to shut down one or more inactive processing cores of the plurality of processing cores and divert a spare power to active processing cores of the plurality of processing cores.

28. The processor of claim 16, wherein receiving the target per-core base clock frequency values and exposing the target per-core base clock frequency values to software comprises executing commands of an interface exposed by the processor.

29. The processor of claim 16, wherein the target service level and the one or more virtual machines or containers are associated with a customer of a cloud service provider.

30. The processor of claim 16, wherein the target service level further indicates one or more of: an allowable power consumption by the virtual machines or containers, an allowable software object instruction mix, an allowable reliability or wear rate, exclusivity of use of the one or more processing cores, and an allowable amount of time for accomplishing a task.

* * * * *